United States Patent [19]
Zheng et al.

[11] Patent Number: 5,851,506
[45] Date of Patent: Dec. 22, 1998

[54] ELECTRODE MATERIALS FROM HYDROUS METAL AND/OR HYDROUS MIXED METAL OXIDES AND METHOD OF PREPARING THE SAME

[75] Inventors: Jian-Ping Zheng, Eatontown; T. Richard Jow, Chatham, both of N.J.

[73] Assignee: The United States of America as represented by the Secretary of the Army, Washington, D.C.

[21] Appl. No.: 678,222

[22] Filed: Jul. 11, 1996

Related U.S. Application Data

[63] Continuation-in-part of Ser. No. 232,901, Apr. 21, 1994, abandoned.

[51] Int. Cl.⁶ .................................................. H01M 4/48
[52] U.S. Cl. .................. 423/592; 252/182.1; 429/218
[58] Field of Search ................... 423/592, 593, 423/594, 598, 599; 502/326, 325, 300; 492/218; 252/182.1

[56] References Cited

U.S. PATENT DOCUMENTS

| | | | |
|---|---|---|---|
| 2,800,616 | 7/1957 | Becker | 361/222 |
| 3,536,963 | 10/1970 | Boos | 204/290 F |
| 3,658,595 | 4/1972 | Batzold | 429/40 |
| 3,839,181 | 10/1974 | Degueldre et al. | 423/599 |
| 3,853,739 | 12/1974 | Kolb | 204/290 F |
| 4,526,884 | 7/1985 | Tsu et al. | 502/154 |
| 4,678,505 | 7/1987 | Busley | 429/40 |
| 4,847,231 | 7/1989 | Gratzel | 502/302 |
| 4,978,778 | 12/1990 | Isshiki et al. | 568/484 |
| 5,003,428 | 3/1991 | Shepard | 204/290 F |

FOREIGN PATENT DOCUMENTS 1196683  6/1985  Canada.

OTHER PUBLICATIONS

Zumdahl, Chemistry, 1986, p. 618; no month.
Conway, Journal of the Electrochemical Society, vol. 138, pp. 1539–15, Jun. 1991.
Raistrick, Proceedings of First Confernece on Capacitors and Similar Energy Storage Devices, Deerfield Beach, FL, Dec. 9–11, 1991, Ansum Enterprises Inc., Boca Raton, FL.

*Primary Examiner*—Gary P. Straub
*Assistant Examiner*—Stuart L. Hendrickson
*Attorney, Agent, or Firm*—Michael Zelenka; George B. Tereschuk

[57] ABSTRACT

An electrode material comprised of hydrous metal oxide, such as ruthenium oxide, is annealed up to temperature just below the temperature at which the hydrous metal oxide would crystallize. Therefore, the hydrous metal oxide remains amorphous or non-crystalline. A hydrous metal oxide material treated in this manner provides a charge storage capacity and energy density greater than 747 F/g and 92 joules/gram, respectively, over 1 V range in a sulfuric acid electrolyte. This invention also provides a method of material preparation, wherein a sol-gel process is used to fabricate the hydrous metal oxides and wherein commercially available hydrous ruthenium oxide powders are treated and annealed.

2 Claims, 5 Drawing Sheets

ELECTRODE MATERIALS FROM HYDROUS METAL AND/OR HYDROUS MIXED METAL OXIDES AND METHOD OF PREPARING THE SAME

CONTINUATION-IN-PART

This application is a continuation-in-part of abandoned U.S. Ser. No. 08/232,901, entitled, "Electrode Materials From Hydrous Metal And/Or Hydrous Mixed Metal Oxides And Method Of Preparing The Same," filed by the same inventors herein on Apr. 21, 1994 and having an attorney docket number of CECOM-5018. Priority of this parent application is claimed.

GOVERNMENT INTEREST

The invention described herein may be made, used, sold or licensed, by or on behalf of the Government of the United States of America, without the payment to us of any royalties thereon.

BACKGROUND OF THE INVENTION

1. Field of the Invention

This invention relates to electrochemical capacitor electrodes comprised of materials from hydrous ruthenium oxide, other hydrous metal oxides, or hydrous mixed metal oxides. More particularly, the invention relates to such electrodes comprised of hydrous ruthenium oxide, or other hydrous metal oxides, or hydrous mixed metal oxides and to electrochemical capacitors or electrochemical power sources comprising such electrodes. This invention also relates to a method for the preparation of fine powders or thick films of such materials at low temperatures.

2. Prior Art

Electrochemical capacitors (EC's) are devices which store electrical energy at the interface between an ionically-conducting electrolyte phase and an electronically-conducting electrode material. EC's were first described in a 1957 patent by Becker. The first practical devices were pioneered by SOHIO as described in U.S. Pat. No. 3,536,963 based on the double-layer capacitance developed at the interface between high-area carbon electrodes and sulfuric acid electrolyte solution. A complementary system, but originating from a different electrochemical phenomenon, that is development of pseudocapacitance associated with a surface reaction, was developed by Conway in 1975, in collaboration with Continental Group, Inc. See Can. Pat. by Craig which is listed infra. The materials possessing pseudocapacitance discovered in Conway et al.'s work are metal oxides which include ruthenium oxide ($RuO_2$), iridium oxide ($IrO_2$), cobalt oxide ($CoO_2$), molybdenum oxide ($MoO_2$), and tungsten oxide ($WO_3$). The most effective material discovered was $RuO_2$ which gives a reversibly accessible pseudocapacitance of many Farads per gram over a 1.4 V range.

Heretofore, $RuO_2$, has been fabricated by the thermal decomposition of ruthenium chloride or hydrous ruthenium chloride. $RuO_2$, like other dioxides of the platinum group, e.g. $RhO_2$, $OsO_2$, and $IrO_2$, exhibits metallic conductivity and possesses the rutile structure. The pseudocapacitance, which arises at the $RuO_2$ and the electrolyte interface, is due to the facile. ionic species absorption on the surface of the $RuO_2$ electrode material.

In order to maximize the charge or energy storage per unit weight of oxides in this type of system, it is desirable to maximize the surface area of the electrode material. Such a maximum BET surface area of 130 $m^2$/gram was achieved by Raistrick for optimized processing.

The observed capacitance per unit mass (F/g) and the observed capacitance per unit area (F/$cm^2$), which are determined from the measured electrochemical capacitance, the measured surface area, and the known amount of $RuO_2$ present in the electrode, are 380 F/g and 200–300 $\mu F/cm^2$, respectively, in a 1 V range in sulfuric acid electrolyte. Based on the assumption that one H may be adsorbed on each exposed O atom, a charge density of 200 $\mu C/cm^2$ is estimated by Raistrick. This suggests that the observed capacitance 380 F/g is the maximum value that can be achieved for $RuO_2$.

These and other references, which are relevant to the present invention, include Can. Pat. No. 1,196,683 issued in 1985 to Craig; U.S. Pat. No. 2,800,616 issued in 1957 to Becker; and U.S. Pat. No. 3,536,963 issued in 1970 to Boos; Conway, *Journal of the Electrochemical Society*, vol.138, pp. 1539–15, 1991; Raistrick, *Proceedings of First Conference on Capacitors and Similar Energy Storage Devices*, Deerfield Beach, Fla., Dec. 9–11, 1991, Ansum Enterprises Inc., Boca Raton, Fla.; and U.S. Pat. No. 5,003,428, issued to Shepherd on Mar. 26, 1991.

SUMMARY OF THE INVENTION

Accordingly, one object of the present invention is to provide materials that have higher capacitance or higher energy density than that of ruthenium oxide ($RuO_2$), the highest energy density material available today, for use as an improved electrode material in electrochemical capacitors.

Possible applications of such a hydrous ruthenium oxide include the following: electrode material for electrochemical capacitors, oxygen or chlorine evolution anodes, thin film resistors in very large scale integrated circuits, or diffusion buffer layers in silicon contact metallization.

According to the present invention, a new electrode material is formed which has an energy density which is more than two times greater than the state-of-the-art material, $RuO_2$. Therefore, the size of the capacitors and similar applications made of the material of this invention will be about half of the present devices. Further, this invention provides advantages over prior art, such as:

(1) Ease of material process; and (2) Smaller capacitor size as a result of higher charge storage capability.

These objectives and advantages are provided by forming an electrode material comprised of hydrous ruthenium oxide which remains amorphous in structure. This material provides a charge storage capacity and energy density greater than 747 F/g and 92 joules/gram, respectively, over 1 V range in a sulfuric acid electrolyte. This invention also provides a method of material preparation, wherein a sol-gel process is used to fabricate the hydrous metal oxides and wherein commercially available hydrous ruthenium oxide powders are treated and annealed. Furthermore, the invention also provides a capacitor incorporating the electrode material of this invention, which capacitor includes:

(1) an anode (a negative electrode) comprising hydrous ruthenium oxide;

(2) an electrolyte comprising sulfuric acid of various concentration or other electrolytes;

(3) a cathode (a positive electrode) comprising hydrous ruthenium oxide.

Such capacitors having electrodes comprised of hydrous ruthenium oxide ($RuO_2 \cdot xH_2O$) exhibit an enhanced, linear voltage-charge relationship, excellent reversibility, and long cycle life.

The energy storage mechanism for capacitors made with $RuO_2.xH_2O$ electrodes are mainly fast faradaic reactions occurring between the bulk of the $RuO_2.xH_2O$ electrode and the electrolyte. It is different with that of double layer capacitors. The energy storage of double layer capacitors is due to the separation of charges at the interface between a solid electrode and an electrolyte. The faradaic reaction mechanism between the amorphous $RuO_2.xH_2O$ electrode and the electrolyte is the hydrogenation of the ruthenium oxide, which is similar to that between a crystalline $Ru_2O$ electrode and the electrolyte. The hydorgenation reaction can be expressed as follows:

However, for crystalline anhydrous $Ru_2O$ electrodes, the faradaic reaction can only occur at the surface of the electrode. Therefore, the $\delta$ value is less than 1 for crystalline $RuO_2$ counting every Ru atom in the material. For the $RuO_2.xH_2O$ treated under the conditions discovered by the present inventors, the $\delta$ value approaches 2. The energy storage density is dependent on the specific surface area of the electrode material. For amorphous $RuO_2.xH_2O$ electrodes made in accordance with the present invention, however, the faradaic reaction will occur in the whole bulk of the electrode. Therefore, the energy density of the amorphous $RuO_2.xH_2O$ electrode will be much higher than that of any anhydrous crystalline ruthenium oxide electrode.

Figure 3:
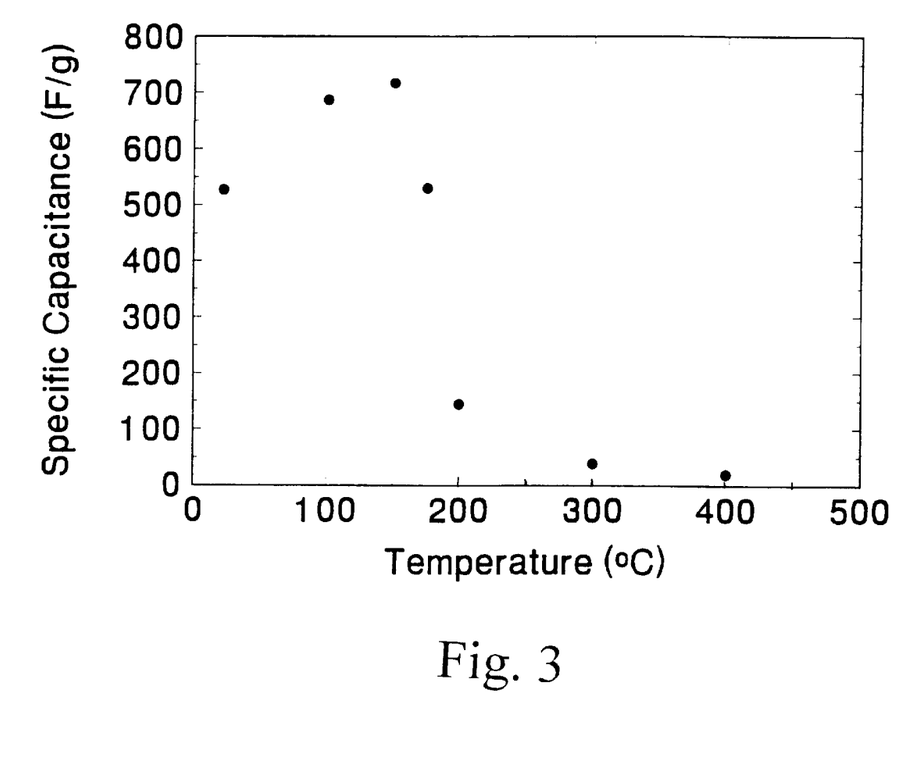
FIG. 3 is a graph of the specific capacitance of $RuO_2.xH_2O$ electrodes as a function of the annealing temperature. The $RuO_2.xH_2O$ electrodes were prepared by a sol-gel process and were annealed at different temperatures. The specific capacitance was calculated based on the cyclic voltammetric measurement. The electrolyte was 0.5 molar solution of $H_2SO_4$.
Figure 4:
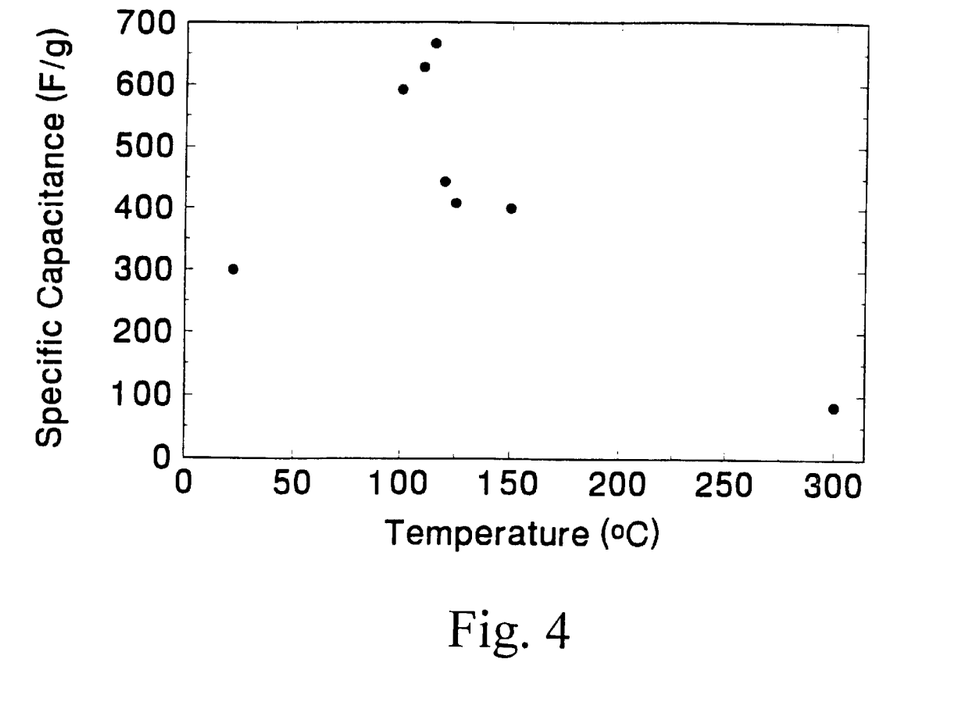
FIG. 4 is a graph of the specific capacitance of $RuO_2.xH_2O$ electrodes as a function of the annealing temperature. The $RuO_2.xH_2O$ electrodes were made from commercial powders and were annealed at different temperatures.

The $H_2O$ content, x, in the oxide affects the charge storage capacity. The x value varies between zero and two. The x value decreases as the annealing temperature increases. As shown in FIGS. 3 and 4, the charge storage capacity increases as the annealing temperature increases. However, the maintenance of the amorphous phase is critical. When the temperature is high enough, the amorphous phase of the material will convert to crystalline phase. The charge storage capacity decreases dramatically as soon as the material becomes crystalline.

The capacitance density of $RuO_2.xH_2O$ provided by the sol-gel method and properly treated according to the present invention acheived a value greater than 747 farad/gram. A single cell capacitor was fabricated and tested with this new electrode material. The energy storage density of the capacitor was greater than 92 joule/gram. These results show clearly that $RuO_2.xH_2O$ treated in accordance to the methods of the present invention is an excellent electrode material for electrochemical capacitors. This material may also be used as electrode material for batteries and catalyst for fuel cells.

This invention provides methods for preparing the materials with high charge storage capacity and high energy density. More importantly, this invention provides materials with specific qualities irrespective fo the preparation methods. It is the specific qualities of the materials that result in the high charge storage capacity and therefore, high energy density. The most critical quality of these materials is the amorphous state of the materials.

BRIEF DESCRIPTION OF THE DRAWINGS

These and other objects of the present invention will be better understood in light of the Detailed Description Of The Preferred Embodiments and the associated drawings wherein.

DETAILED DESCRIPTION OF THE PREFERRED EMBODIMENTS

The electrochemical capacitor of this invention includes electrodes comprising hydrous ruthenium oxide, $RuO_2.xH_2O$ or ruthenium oxide in the hydrous form. The hydrous ruthenium oxide for use in the electrodes of the electrochemical capacitor of this invention has properties which are different from those heretofore described in the prior art as for example in Conway.

In accordance with one method of the present invention, this material, which has a different composition from that of anhydrous ruthenium oxide, is attained by a novel process. In prior art methods, ruthenium oxide, $RuO_2$, was prepared by decomposing the aqueous ruthenium chloride, $RuCl_3$, solution at approximately temperatures of 300°–400° C. In contrast, the process used in this invention involves hydrolyzing ruthenium chloride in an aqueous solution, the hydrolysis being promoted by the addition of the hydroxide of sodium, lithium, or ammonia, which controls and stabilizes the pH of the solution. Therefore, the gel formed can be precipitated by then adjusting the pH to higher values.

The above process is also called the sol-gel process. The surface area of hydrous ruthenium oxides thus formed by the present invention has of a value as 45 m /gram or higher. This sol-gel process also allows the formation of films or buffers at low temperatures. The hydrous ruthenium oxide can be further heated and formed with ruthenium oxide at temperatures above 270° C. to have a surface area of 26 $m^2$/gram. The hydrous ruthenium oxide exhibits electronic properties similar to those of ruthenium oxide as well as enhanced ionic properties which allows additional charge storage for protons in both the surface and the bulk of the oxides.

Further, the preparation of hydrous ruthenium oxide has been reported. However, the use of hydrous ruthenium oxide for electrochemical capacitors has not been reported before. Similarly, the use of other hydrous metal oxides has not been reported. Of course, as those skilled in the art will recognize, the preparation of other mixed metal oxides is also known, and therefore, the present invention will also extend to other hydrous metal oxides and hydrous mixed metal oxides. For example, this invention would apply to hydrous metal oxides wherein the metal may be ruthenium, rhodium, rhenium, osmium or iridium. Of course, those skilled in art will readily recognize from this disclosure that other mixed metals/metals would include cobalt, tungsten, manganese, tantalum, molybdenum, etc. Therefore, it is expected that the hydrous mixed metal oxides will maintain electronic properties similar to those of mixed metal oxides as well as provide additional charge storage.

In one preferred method of fabricating the new electrode material, $RuO_2.xH_2O$ is produced from a starting material, $RuCl_3.xH_2O$ (42% Ru), by a sol-gel process which is described in detail below. Briefly though, the $Ru(OH)_4$ powder is formed by mixing solutions of $RuCl_3.xH_2O$ and NaOH to form precipitating powders of $Ru(OH)_4$. The weight of this precipitate should measure to be approximately 76% of the weight of the starting material of $RuCl_3.xH_2O$. From this weight measurement, it may be inferred that the precipitated powder may be $Ru(OH)_4$. However, for purposes of the present invention, it is not important what kind ruthenium compound is used at this stage, because this is only an intermediate product. Accordingly, and as those skilled in the art will readily appreciate, the $Ru(OH)_4$ can be made with different starting materials and reduction agents. For example, the starting materials can be ruthenium chloride, ruthenium bromide, ruthenium nitrosyl chloride, ruthenium nitrosylnitrate and ruthenium 2,4-pentanedionate. Moreover, the reduction agents can be various alkalies or salts such as NaOH, $NaCO_3$, $NaHCO_3$, $NaNO_3$, KOH, $K_2CO_3$, $KNO_3$, and $NH_4OH$, etc.

After the $Ru(OH)_4$ is produced, then $RuO_2.xH_2O$ and $RuO_2$ are formed by heating the $Ru(OH)_4$ to temperatures of 100° C. and 300° C. respectively. It is critical, however, that the treated powders according to the present invention not be subjected to temperatures above 300° C.

The annealing temperature of the present invention is a very important factor in determining the specific capacitance of the electrode. At lower temperatures, i.e. below 200° C., $RuO_2.xH_2O$ remains in an amorphous state. When the annealing temperature is increased, both the amount of the powders in the crystalline phase and the crystallite size increases. At temperatures above 300° C., the cyrstalline phase of anhydrous $RuO_2$ is formed.

Figure 1:
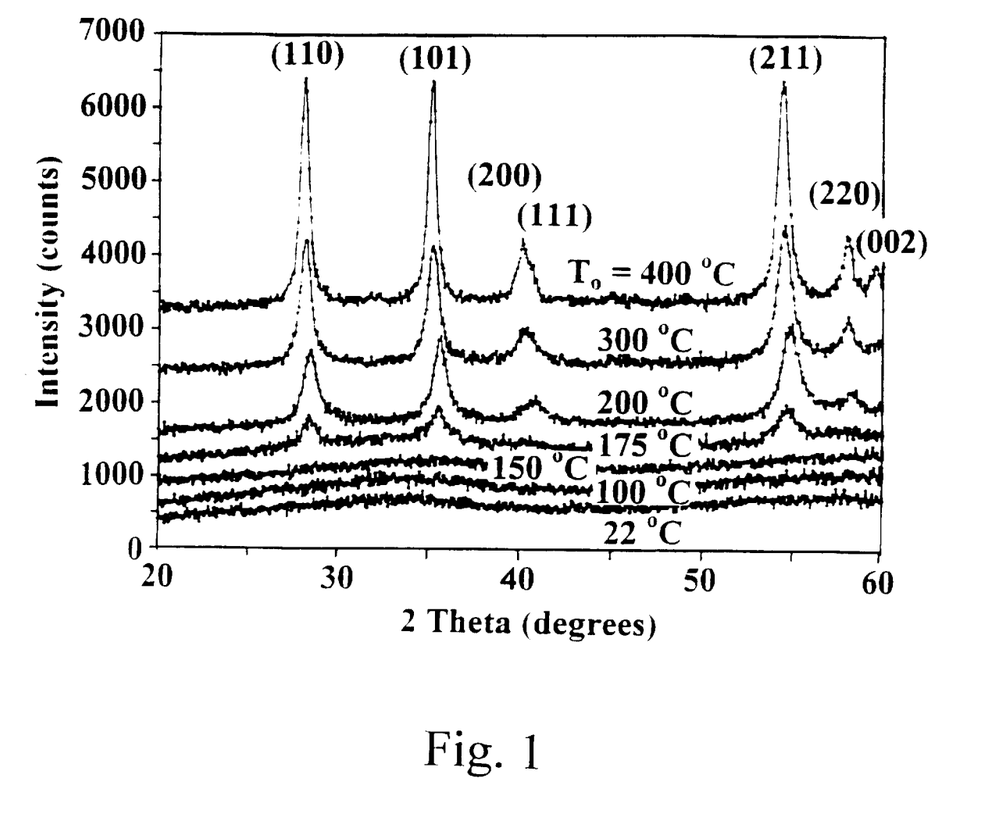
FIG. 1 is a plot of X-ray diffraction patterns for $RuO_2.xH_2O$ prepared by a sol-gel process and annealed at different temperatures.
Figure 2:
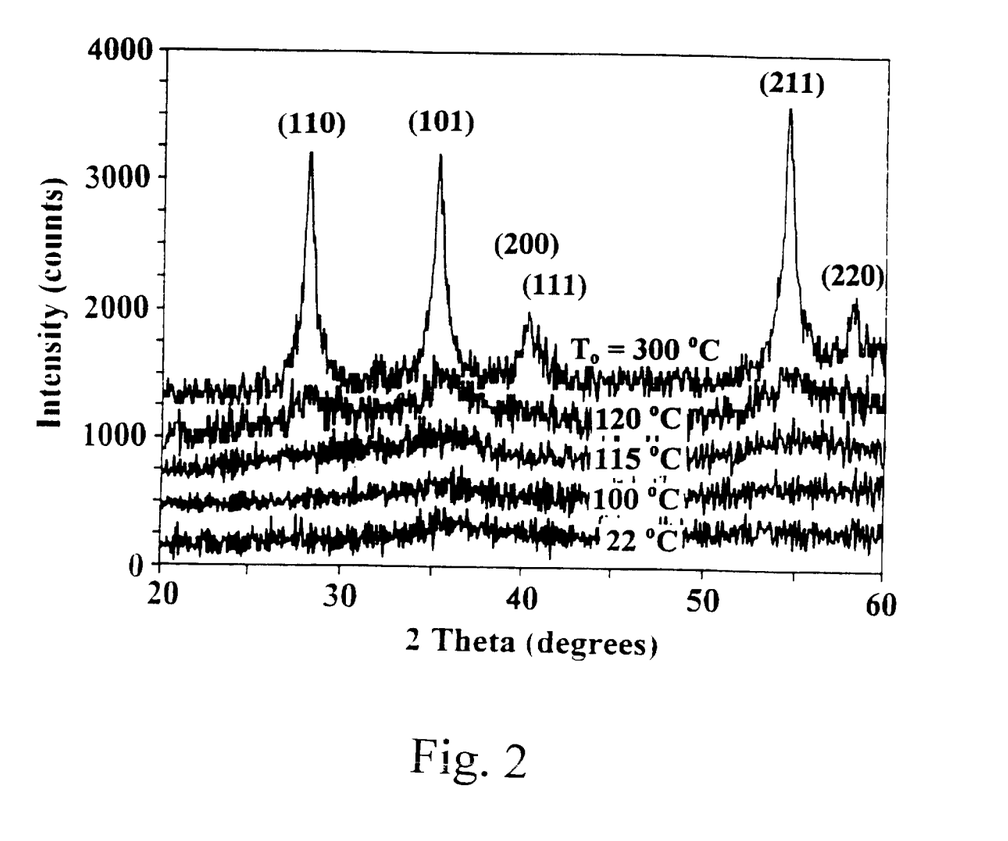
FIG. 2 is a plot of X-ray diffraction patterns for $RuO_2.xH_2O$ made from commercial powders and annealed at different temperatures.

FIGS. 1 and 2 show from X-ray diffraction analysis that depending on the source of the $RuO_2.xH_2O$, the crystalline phase of $RuO_2.xH_2O$ can be obtained between 200° C. and 300° C. FIG. 1 is a plot of X-ray diffraction patterns for $RuO_2.xH_2O$ prepared by a sol-gel process and annealed at different temperatures. As shown the crystalline peaks begin to form around 175° C. and are well defined at 200° C. for $RuO_2.xH_2O$ formed by the sol-gel process of the present invention. However, FIG. 2 shows that for $RuO_2.xH_2O$ made from commercial powders and annealed at different temperatures the crystalline peaks do not form until 300° C. Therefore, depending upon the process used to form the $RuO_2.xH_2O$, it is critical to the present invention that the $RuO_2.xH_2O$ remain in an amorphous state and the annealing temperature used must not rise above the crystalline formation temperature.

Therefore, maximum specific capacitance can be obtained from an electrode prepared in accordance with the present invention, either from the $RuO_2.xH_2O$ formed by the sol-gel process described in detail below or from commercially available $RuO_2.xH_2O$ powders, by annealing either powder at a temperature just below the critical temperature to form the crystalline phase of the hydrous metal oxide. FIGS. 3 and 4 show graphs of the specific capacitance as a function of annealing temperature for electrodes made from the sol-gel process (FIG. 3) and commercially available $RuO_2.xH_2O$ (FIG. 4). The water content of these materials exhibits the maximum capacitance value where x is between 0 to 0.5. FIG. 3 shows specific capacitance of at least 500 Farads/gram of $RuO_2.xH_2O$ powder electrodes made by a sol-gel process, and at annealing temperatures below 175° C., these powders are amorphous with a water content, x, below 2.0. FIG. 3 also shows that when the annealing temperature is higher than 175° C., the specific capacitance decreased rapidly to values below 500 Farads/gram because crystalline $RuO_2.xH_2O$ started to form at the higher temperature. By comparing the results between the specific capacitance and the crystalline phase, it is found that for the electrode with the amorphous phase, the specific capacitance is high, i.e. at least 500 Farads/gram, and increases with the annealing temperature. However, when the crystalline structure is formed, the specific capacitance of the electrode decreases rapidly. FIG. 4 demonstrates that when the annealing temperature exceeds 120° C., the specific capacitance decreased rapidly below 500 Farads/gram because crystalline $RuO_2.xH_2O$ started to form, as depicted in FIG. 2. Therefore, the maximum value of the specific capacitance can be obtained at the temperature which is just below the critical temperature at which the crystalline phase of $RuO_2.xH_2O$ starts to be formed. As shown, a maximum specific capacitance as high as 768 F/g is obtained from an electrode prepared at this optimal annealing temperature.

One specific example of the method of forming $RuO_2.xH_2O$ according to present invention is set forth below.

EXAMPLE OF FORMING $RuO_2.xH_2O$

The $Ru(OH)_4$ powder is prepared as follows: the required amount of $RuCl_3.nH_2O$ (42% wt. Ru) is dissolved in distilled water to give a concentration of 0.1 mol. At the same time, the NaOH is dissolved in distilled water to a concentration of 0.3 mol. Then, the NaOH solution is added slowly into the $RuCl_3.nH_2O$ solution. In this process, the NaOH is employed primarily for the purpose of adjusting and stabilizing the pH at a value of approximately 7, the point at which a controlled precipitation occurs. During mixing, the $RuCl_3.nH_2O$ solution is stirred. After stopping the stirring and waiting for a while, it can be seen that $Ru(OH)_4$ fine powders will precipitate in the NaCl solution. Thus, the process used in this invention involves hydrolyzing ruthenium chloride in an aqueous solution, the hydrolysis being promoted by the addition of the hydroxide of sodium, lithium, or ammonia, which controls and stabilizes the pH of the solution. Therefore, the gel formed can be precipitated by then simply adjusting the pH to higher values without the need of decomposing the aqueous ruthenium chloride, $RuCl_3$, solution at approximately temperatures of 300°–400° C., as was previously done in the prior art.

$Ru(OH)_4$ fine powders are, then, separated from the NaCl solution by a filter with 8 $\mu$m pore size. The hydrolysis product is washed five times in distilled water by the following procedures: An amount of distilled water is added into a beaker containing $Ru(OH)_4$ powders to give a concentration of 0.2 mol and is stirred with a magnetic stirrer for about 30 min. Then, the solution is filtered. The dry $Ru(OH)_4$ powders can be obtained by drying the precipitate in a vacuum. At this stage, the final fine powders should be $Ru(OH)_4$ based on the weight change from the starting material. However, the final fine powder may be $Ru(OH)_3.xH_2O$ or $RuO_2.2H_2O$ since the molecular weights of $Ru(OH)_4$, $Ru(OH)_3.xH_2O$ and $RuO_2.2H_2O$ are so close.

The $RuO_2.xH_2O$ and $RuO_2$ are formed by heating $Ru(OH)_4$ to 100° C. and 300° C. in air for about 16 hours, respectively. The weight loss should be approximately 12.5% and 21.5%, respectively. It should be noted, however, that the process of using vacuum to dry $Ru(OH)_4$, is an unnecessary step for formations of $RuO_2.xH_2O$ and $RuO_2$ because they can be formed by directly heating the wet $Ru(OH)_4$ to higher temperatures.

After forming the $RuO_2.xH_2O$, the inventors herein studied various quality aspect of this material for use in capacitors. From the following, those skilled in the art will readily recognize the advantages of this material for use in capacitors.

Figure 5:
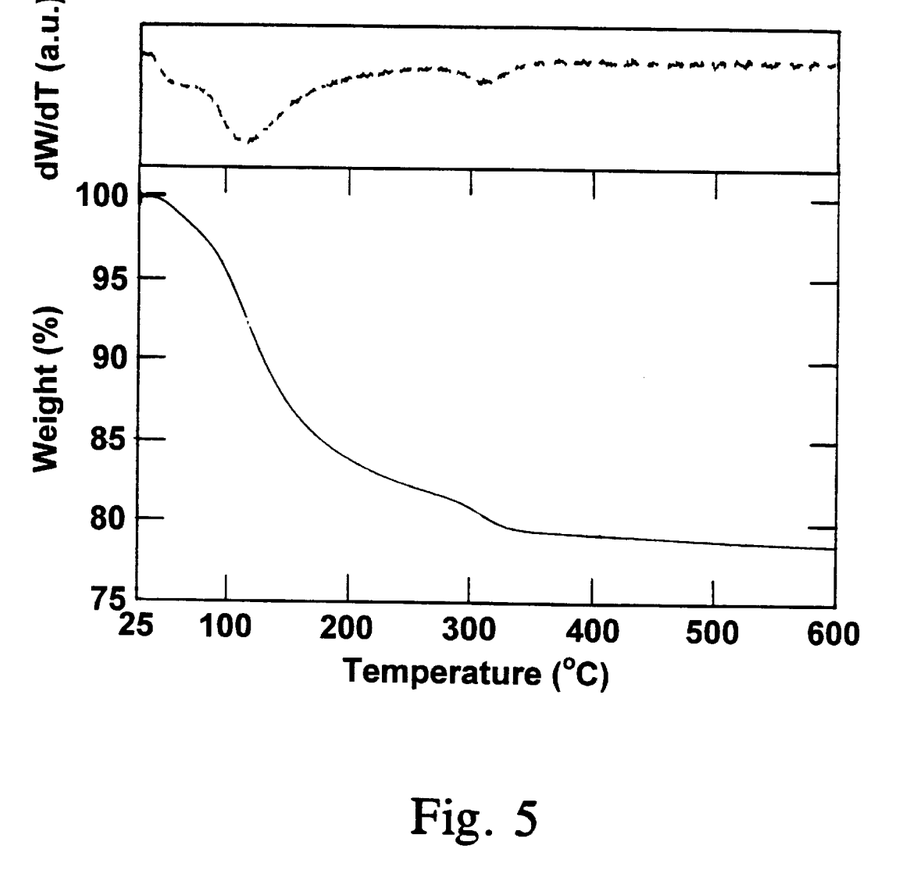
FIG. 5 is a graph of the weight loss as function of the annealing temperatures. The solid line was measured by a thermogravimetric analyzer at a temperature scan rate of 10° C./min. The starting material at 25° C. was $Ru(OH)_4$ at a quantity of 12.93 mg. The dotted line is the derivative weight loss.

A thermogravimetric analyzer (TGA) was used to study the weight change during the thermal processes as shown in FIG. 5. It was found that the weight decreased continually with increasing the temperature up to 300° C. At temperatures above 300° C., the rate of the weight loss was much lower with increasing the temperature. Two peaks were obtained from a derivation of the TGA curve and appeared at 100° C. and 300° C. The first peak at 100° C. is believed to be due to the formation of $RuO_2.xH_2O$. The weight change between the first and the second peak is due to dehydration process to form $RuO_2$. The precision weight losses were measured for powders after annealing at 100° C. and 300° C. and were 12.5% and 21.5%, respectively. These results confirmed the inference that $RuO_2.xH_2O$ and $RuO_2$ were formed at temperatures of 100° C. and 300° C., respectively. This inference was also confirmed by crystalline structure measurements shown in FIG. 1.

The crystalline structure of powders was characterized by an X-ray diffractometer. No sharp peaks were obtained from the powder annealed at 100° C., which indicates that the $RuO_2.xH_2O$ is amorphous. From those powders annealed at 300° C., three strong x-ray diffractive peaks were obtained at 28°, 35° and 54° which correspond to (110), (101) and (211) lattice planes of the $RuO_2$ crystal. See FIG. 1.

From the TGA and the x-ray diffractometer studies, it was found that the temperature for formation of $RuO_2.xH_2O$ or $RuO_2$ are critical. The $RuO_2.xH_2O$ may only be formed in the temperature range from 50° C. to 200° C., and the crystalline $RuO_2$ is formed at temperatures higher than 200° C. Usually the longer time was needed for the lower temperature to completely form above chemical compounds. Combining the results from the TGA, x-ray diffraction, and specific capacitance measurements, it was also found that the water content, x, was in the range of 0.2 to 2.0 preferably from 0.2 to 1.8, most preferably between 0.2 to 1.0 and the $RuO_2.xH_2O$ material was of an amorphous phase.

The specific surface areas of $RuO_2.xH_2O$ and $RuO_2$ powders were determined by the nitrogen absorption measurement and were 44.7 and 26.2 $m^2$/gram, respectively. These values are much less than those of carbon based electrode materials which were widely used for double layer capacitors. It was found that the higher specific surface area of $RuO_2.xH_2O$ or $RuO_2$ can be achieved with the lower concentration of the $RuCl_3.nH_2O$ and NaOH solutions. It was found that in general the specific surface area reduces when the annealing temperature is increased. It was also found that the specific surface area is dependent on the other sample preparation conditions, such as the concentration of the $RuCl_3.xH_2O$ and NaOH solutions, as well as greatly depending on the pH value at which two solutions were mixed. It has been shown that the specific surface area of the $RuO_2$ powder is less than that of the $RuO_2.xH_2O$ powder. This is because the small particles tend to nucleate and to form larger crystalline particles at high temperatures. However, it was also found that that the specific capacitance is insensitive to the specific surface area for the $RuO_2.xH_2O$ electrodes made at the optimal temperature. But for other powders having exhibiting some crystalline phase, the specific capacitance is strongly dependent on the value of the specific surface area.

It is difficult to obtain the resistivity from powder materials. However, pellets of $RuO_2.xH_2O$ and $RuO_2$ were made by pressing powders under a pressure of 800 Pa. The resistivity of these pellets was measured to be $4.5 \times 10^{-3}$ $\Omega$-cm and $6.0 \times 10^{-3}$ $\Omega$-cm, respectively. These values are at least two orders of magnitude higher than those of bulk materials. Nevertheless, the resistivity of the $RuO_2.xH_2O$ pellet is lower than that of the $RuO_2$ pellet. The high resistivity is mainly contributed from the contacting resistance between particles. The real resistivity of $RuO_2.xH_2O$ itself should be much lower than this value. It was demonstrated that highly conductive $RuO_2$ electrodes could be made by coating the $RuCl_3$ solution on the metallic substrate, which is then thermally decomposed. The highly conductive $RuO_2.xH_2O$ thin film electrode, therefore, can also be achieved.

Further, the resistivity of $RuO_2.xH_2O$ pellets was also calculated based on the value of the sheet resistance measured by a standard four probe technique. These pellets were made by pressing $RuO_2.xH_2O$ powders at a pressure of 8,000 lb/cm. It was found that for $RuO_2.xH_2O$ powders made at lower temperatures, the resistivity of the $RuO_2.xH_2O$ pellet was higher ($>10^{-3}$ $\Omega$-cm). But for $RuO_2.xH_2O$ powders made at temperatures higher than 100° C., the resistivity of the $RuO_2.xH_2O$ pellet is insensitive to the annealing temperature and was on the order of $10^{-3}$ $\Omega$-cm. The resistivity of the $RuO_2.xH_2O$ pellet made at the optimal temperature was about $2-3 \times 10^{-3}$ $\Omega$-cm. This value is believed to be dominated by the contact resistance of the powders. The bulk resistivity of $RuO_2.xH_2O$ may be much lower than this value. However, overall the resistivity of the $RuO_2.xH_2O$ pellets was sufficiently low for use in electrochemical capacitors.

The capacitance densities of $RuO_2.xH_2O$, $RuO_2$ and carbon black were measured by the cyclic voltammetric measurement in the electrolyte of 0.5 mol $H_2SO_4$. The details of this measurement are described below. From Table 1, it can be seen that the capacitance density of $RuO_2.xH_2O$ is the highest one. The most remarkable feature is that the specific capacitance of $RuO_2.xH_2O$ is higher than that of $RuO_2$. As indicated, the higher capacitance density achieved in this new material is not only due to the higher surface area but also the intrinsic nature of the material. From the cyclic voltammetric curve, two peaks were obtained at potentials of about 0.4 volt and 0.9 volt versus the saturated calomel electrode. Therefore, the capacitance developed between this material and the electrolyte is believed to be predominantly pseudocapacitive.

Capacitance Density

The capacitance densities of carbon black pearls-2000, $RuO_2$ and $RuO_2.xH_2O$ powders were measured by the cyclic voltammetry. The carbon black pearls-2000 is commercially available and has the specific surface area of 1470 $m^2$/gram. Firstly, the carbon black, $RuO_2$ or $RuO_2.xH_2O$ powders soaked in 0.5 mol $H_2SO_4$ at the boiling temperature. During the measurement, the working electrode was made with the electrode material pasted on the platinum gauze. The counter electrode was a platinum gauze, 80 times as large as the working electrode.

The reference electrode was a saturated calomel electrode (SCE). The electrolyte, 0.5 mol $H_2SO_4$ solution, was bubbled with nitrogen gas to avoid the influence of dissolved oxygen. The voltammetric curves at 0.5 mV/sec were recorded in the potential range from 0 to 1.0 volt (vs. SCE). Capacitance densities of different electrode materials were average values within the potential range from 0 to 1.0 volt (vs. SCE) and are summarized in Table 1, which includes surface area, capacitance density and specific capacitances of carbon black pearls-2000, $RuO_2$ and $RuO_2.xH_2O$ fine particles. The specific surface area was measured by a nitrogen absorption method. The capacitance density was measured by a cyclic voltammetry.

TABLE 1

| Electrode Material | Specific Surface Area ($m^2$/gram) | Capacitance Density (farad/gram) | Specific Capacitance ($\mu$farad/$cm^2$) |
| --- | --- | --- | --- |
| Carbon Black | 1475 | 250 | 17 |
| $RuO_2$ | 26.2 | 200 | 756 |
| $RuO_2.xH_2O$ | 44.7 | 747 | 1671 |
| $RuO_2.xH_2O$(95%) Teflon(5%) | — | 630 | — |

In application, $RuO_2.xH_2O$ is introduced in a capacitor. For purposes of this application single cell capacitors will be described. However, as those skilled in the art will readily recognize other capacitor applications will also benefit from the present invention, such as those mentioned in the Summary of the Invention.

For comparison, single cell capacitors were built with two different types of electrodes. The detailed configuration of these capacitors is described below. The energy densities of the two capacitors were measured to be 92 J/gram (184 J/$cm^2$) and 68 J/gram (121 J/$cm^3$) for a capacitor using a powder $RuO_2.xH_2O$ electrode and a capacitor using a film electrode, respectively. The film electrode contained $RuO_2.xH_2O$ powder mixed with 5% teflon. As shown in Table 2, the energy density of $RuO_2.xH_2O$ corresponds to capacitance densities of 738 farad/gram for a single electrode and agrees with the measurement of the cyclic voltammetry. The most important feature to be noted is that the energy density of this new material is the highest one available today and is at least two times higher than that reported for $RuO_2$.

Capacitor Formation

Three types of capacitors were fabricated and tested. The first type was made using the powder form of $RuO_2.xH_2O$ directly as electrodes. The $RuO_2.xH_2O$ powder was impregnated with acid solution of 38% weight $H_2SO_4$ at the boiling temperature. Then, the excess acid solution was filtered. The size of each electrode had a diameter of 0.5 inch and a thickness of 23 mil. The gravimetric density of the electrode was about 2 gram/$cm^3$ for the $RuO_2.xH_2O$ electrode only. A 2 mil thick tantalum foil was used as the current collector and a 5 mil thick glass fiber paper, which was soaked with the acid solution, was used as the separator. The capacitor was finally sealed by a Teflon™ container. The second type was made using a 5% Teflon™ bonded $RuO_2.xH_2O$ electrode of a thickness about 12 mil. The basic configuration of the capacitor is the same as the first one.

The electrolyte includes a sulfuric acid of a concentration which varies from 0.5 to 4 moles. Other electrolytes including KOH of various concentrations, solid polymeric electrolytes (such as Nafion™), and organic electrolyte may also be employed in this invention.

Capacitances of these two capacitors were measured by a dc charge and discharge method at a constant current for the voltage range from 0 to 1 volt between two electrodes. The capacitance was calculated by the current multiplied by the time of the discharge process which is summarized in Table 2 for the various electrode materials. The energy densities were calculated based on these capacitance values and the operating voltage of 1 volt. The capacitance densities and the energy densities, measured with dc charge and discharge method are shown in Table 2.

TABLE 2

| Electrode Material | Capacitance Density (F/g) | Capacitance Density (F/$cm^3$) | Energy Density (J/g) | Energy Density (J/$cm^3$) |
| --- | --- | --- | --- | --- |
| Carbon Black | 82 | 60 | 10 | 7.5 |
| $RuO_2$ | 198 | 542 | 24.8 | 68 |
| $RuO_2.xH_2O$ | 738 | 1475 | 92.3 | 184 |
| $RuO_2.xH_2O$ Teflon | 540 | 970 | 68 | 121 |

It must be pointed out that the capacitance or the energy densities described in this embodiment are not the maximum values for this new material. For every ruthenium oxide, two hydrogen could be inserted into the new material as shown in Eq. 1. This suggests that the capacitance of a value of 1,000 F/g could be achieved with materials according to the present invention. A lower value of 760 F/g for this new material achieved in this invention may be due to slight impurities present during preparation. Therefore, the higher capacitance and energy densities can be expected for the $RuO_2.xH_2O$ electrode material.

A third capacitor was built with the $RuO_2.xH_2O$ powder electrodes which were made at the optimal annealing temperature. The electrode material was pre-wetted by back filling the electrolyte in a vacuum. 39 weight % of sulfuric acid solution was used as the electrolyte. Two identical electrodes separated by a porous membrane with a thickness about 50 $\mu$m. The porous membrane was impregnated with the electrolyte. The maximum voltage which could be applied on a single cell was found to be over one volt. The energy density was calculated from the dc discharge process of the capacitor and was about 96 J/g (or 26.7 Whr/kg) based on the weight of the hydrous ruthenium oxide powders only. This value is consistent with that calculated from the value of the specific surface area which is measured by the cyclic voltammogram. The energy deliverable efficiency was estimated from the capacity ratio between the discharge and charge processes and was over 95%. This third capacitors performance was also studied at different temperatures. It was found that within the temperature range from −52° C. to 73° C., the variation of the capacitance was less than 20%. The cycle life test was also performed for this capacitor and it was cycled for about 60,000 cycles.

The stability of this new material was also studied by the inventors. To accomplish this, a capacitor was built with the powder electrode and was tested under the dc charge and discharge. Until now, this capacitor has been cycled over 4000 times. It was found that the capacitance decayed 5% during the first three cycles, since then the capacitance was much stable and only decayed another 5% until the 4000th cycle. From the dc charge and discharge measurement, the efficiency of the capacitor can be obtained and is higher than 90%.

Although the present invention has been described with regard to three specific embodiments as to how to manufacture the above identified material, those skilled in the art will readily recognize that other variations of manufacturing this material are available. Accordingly, the inventors do not wish to be limited by the present specification, but only by the appended claims.

What is claimed is:

1. An electrode material for electrochemical devices comprising amorphous, hydrous ruthenium oxide having the formula $RuO_2 \cdot xH_2O$, where x is a water content value which is between 0.2 and 2.0, and a specific capacitance value greater than 500 Farads/gram.

2. The electrode material of claim 1 wherein said x water content value is between 0.2 and 1.8.

* * * * *